(12) United States Patent
Hansen

(10) Patent No.: US 8,196,971 B2
(45) Date of Patent: Jun. 12, 2012

(54) CLAMP CONNECTOR FOR CLAMPING TOGETHER CONNECTING PIECES ON PIPELINES

(76) Inventor: Bernd Hansen, Sulzbach-Laufen (DE)

( * ) Notice: Subject to any disclaimer, the term of this patent is extended or adjusted under 35 U.S.C. 154(b) by 0 days.

(21) Appl. No.: 12/736,572

(22) PCT Filed: Apr. 17, 2009

(86) PCT No.: PCT/EP2009/002826
§ 371 (c)(1),
(2), (4) Date: Oct. 20, 2010

(87) PCT Pub. No.: WO2009/146764
PCT Pub. Date: Dec. 10, 2009

(65) Prior Publication Data
US 2011/0042947 A1    Feb. 24, 2011

(30) Foreign Application Priority Data
Jun. 3, 2008  (DE) .......................... 10 2008 026 563

(51) Int. Cl.
*F16L 23/00*    (2006.01)
(52) U.S. Cl. .......................... 285/367; 285/410; 285/420
(58) Field of Classification Search .................. 285/367, 285/410, 409, 411, 415, 420
See application file for complete search history.

(56) References Cited

U.S. PATENT DOCUMENTS

| | | | | |
|---|---|---|---|---|
| 2,403,606 A * | 7/1946 | Meyer | ............................ | 285/367 |
| 2,695,437 A * | 11/1954 | Bernard | ........................ | 285/410 |
| 3,630,552 A * | 12/1971 | Byron | ............................ | 285/367 |
| 4,657,284 A * | 4/1987 | Fiori | .............................. | 285/367 |
| 7,677,612 B2 * | 3/2010 | Maunder | ........................ | 285/411 |
| 7,883,121 B2 * | 2/2011 | Henry | ............................ | 285/367 |
| 2003/0227171 A1 | 12/2003 | Legeai et al. | | |
| 2005/0258648 A1 | 11/2005 | Newman | | |
| 2006/0197344 A1 | 9/2006 | Henry | | |

FOREIGN PATENT DOCUMENTS

DE     42 10 383 A1   10/1993
DE     197 57 969 A1   7/1999

OTHER PUBLICATIONS

Klemmverbindungen Für Rohre Aus Nichtrostendem Stahl, Din 32676, Feb. 2001, pp. 1-6.

* cited by examiner

*Primary Examiner* — David E Bochna
(74) *Attorney, Agent, or Firm* — Roylance, Abrams, Berdo & Goodman, L.L.P.

(57) ABSTRACT

A clamp connector for pipeline connecting pieces (5) has two clamping ring parts (1, 3) pivotably connected at one end between spread positions and clamping positions. A clamping device is situated at the opposite end of the clamping ring parts (1, 3) from the pivot connection (11). The clamping device has a clamping screw (19) pivotable from an active position with the clamping screw (19) interacting with the clamping ring parts (1, 3) to generate a clamping force pressing the clamping ring parts (1, 3) into the clamping positions, and a release position with the clamping screw (19) pivoted away from the clamping positions to release the clamping ring parts (1, 3). The clamping device has a locking device (25, 27) which, in its active state prevents the clamping screw (19) from being pivoted into the release position and which, as a function of the spread of the clamping ring parts (1, 3), passes through an opening angle from the active state into a release state in which the clamping screw (19) can be pivoted out.

5 Claims, 2 Drawing Sheets

CLAMP CONNECTOR FOR CLAMPING TOGETHER CONNECTING PIECES ON PIPELINES

FIELD OF THE INVENTION

The invention relates to a clamp connector for clamping together connecting pieces on pipelines. Two clamping ring parts are connected on one end by a joint arrangement and can pivot around the joint arrangement between the spread positions and clamped positions. The clamping ring parts are situated close to one another in the clamped positions. A clamping device is located on the end of the clamping ring parts opposite the joint arrangement and has a clamping screw pivotable from an active position in which it works together with the clamping ring parts to generate a clamping force that forces the clamping ring parts into the clamped positions and a release position pivoted out therefrom.

BACKGROUND OF THE INVENTION

Clamp connectors of this type are known. For example, according to DIN (© DIN: Deutsches Institut fur Normung e. V. [German Institute for Standardization, Registered Association]) 32676. Clamping connections with such clamp connectors for fittings for the food, chemical, and pharmaceutical industries are standardized for a relatively large range of nominal sizes. In such clamp connectors, the clamping rings work together with clamping connection pieces that can be connected as, for example, welded connection pieces with corresponding pipe ends, in such a way that the axial force for clamping the connecting pieces together is generated by a radial clamping force acting on them by oblique surfaces inclined on the connection pieces with respect to the longitudinal axis of the pipe.

Since, according to the applicable standards provisions, such clamp connectors are usable at pressures of up to 16 bar, even with large nominal widths, special requirements regarding operating safety are provided.

SUMMARY OF THE INVENTION

An object of the invention is to provide a clamp connector offering a high degree of operating safety during handling, especially when an elevated level of pressure is involved.

According to the invention, this object is basically accomplished by a clamp connector having a clamping device equipped with a locking device acting as a safety mechanism to allow the clamping screw to pivot away only when, during a working cycle in which the clamping connection is separated, the clamping ring parts are initially spread out from the clamping position through a predetermined opening angle. This requirement avoids the risk that even a slight loosening of the effective tightening of the clamping screw could cause the screw to pivot out of the active position, thus leading to a sudden loosening of the connection under pressure and the concomitant risks associated therewith.

In especially advantageous embodiments, the clamping screw has an end pivotally connected to the first clamping ring part by a pivot-out joint, an end-side threaded segment and a collar larger in diameter than the threaded segment and adjacent to the pivot-out joint. The second clamping ring part has a passage through which the clamping screw passes in the active position and has an exit slot for the clamping screw allowing the clamping screw to pivot out. The width of the slot, at least in the slot area adjacent to the first clamping ring part, is smaller than the diameter of the collar and larger than the diameter of the threaded segment of the clamping screw. The operating principle of the locking device involves for pivot-out motion, the clamping screw being able to emerge from the exit slot only when an opening angle is reached at which the expanded collar of the clamping screw has left the exit slot. After reaching the opening angle, the threaded segment, which is smaller in diameter, can pivot out of the exit slot. This design of the locking device is characterized by an especially simple construction.

An especially high degree of operating safety is ensured in the case of embodiments in which on the second clamping ring part has surface area parts that overlap associated surface area parts of a clamping nut located on the threaded segment of the clamping screw. In the active position, loosening of the clamping nut causes the clamping ring parts to be spread apart. With this arrangement, the clamping ring parts are forced apart when the clamping nut is loosened. This arrangement avoids the risk that, in cases where sometimes, when the clamping nut is loosened and the clamping ring parts are wedged in the clamped position and do not immediately follow the motion of the clamping nut, a sudden spreading motion will occur under pressure. The spreading motion that is necessarily caused by the loosening of the clamping nut ensures that a controlled spreading and thus a controlled reduction of pressure will occur before pivoting-out of the clamping screw takes place.

In advantageous embodiments, the clamping nut has a longitudinal segment housed in the passage of the second clamping ring part with the clamping screw in the active position. The longitudinal segment has an area generating the spreading force when the nut is loosened. The clamping force is transferred to step surfaces of the passage when the nut is tightened.

In this case, the nut in the area accommodated in the passage has a round shank part and a ring body protruding radially therefrom like a flange. One flange surface of the ring body forms the end of the shank part and the surface transferring the clamping force. Its other surface forms the surface that transfers the spreading force.

With the clamping nut designed in this way, the passage and its exit slot can be stepped in the second clamping ring part such that the ring body can be moved into and out of the passage through an enlarged section of the exit slot. At the end of the enlarged section, the step surfaces extending into the passage and transferring the clamping force of the adjacent flange surface of the ring body of the nut are formed.

To transfer the spreading force acting on the second clamping ring part when the nut is loosened, the enlarged section of the exit slot can be formed by grooves made in the two side walls of the slot. The side walls of the grooves form a guide channel for the ring body of the clamping nut when pivoting into the active position and pivoting out into the release position. The side surfaces of the grooves form the step surfaces in the passage that transfer the clamping force, as well as the surface area parts that transfer the spreading force.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
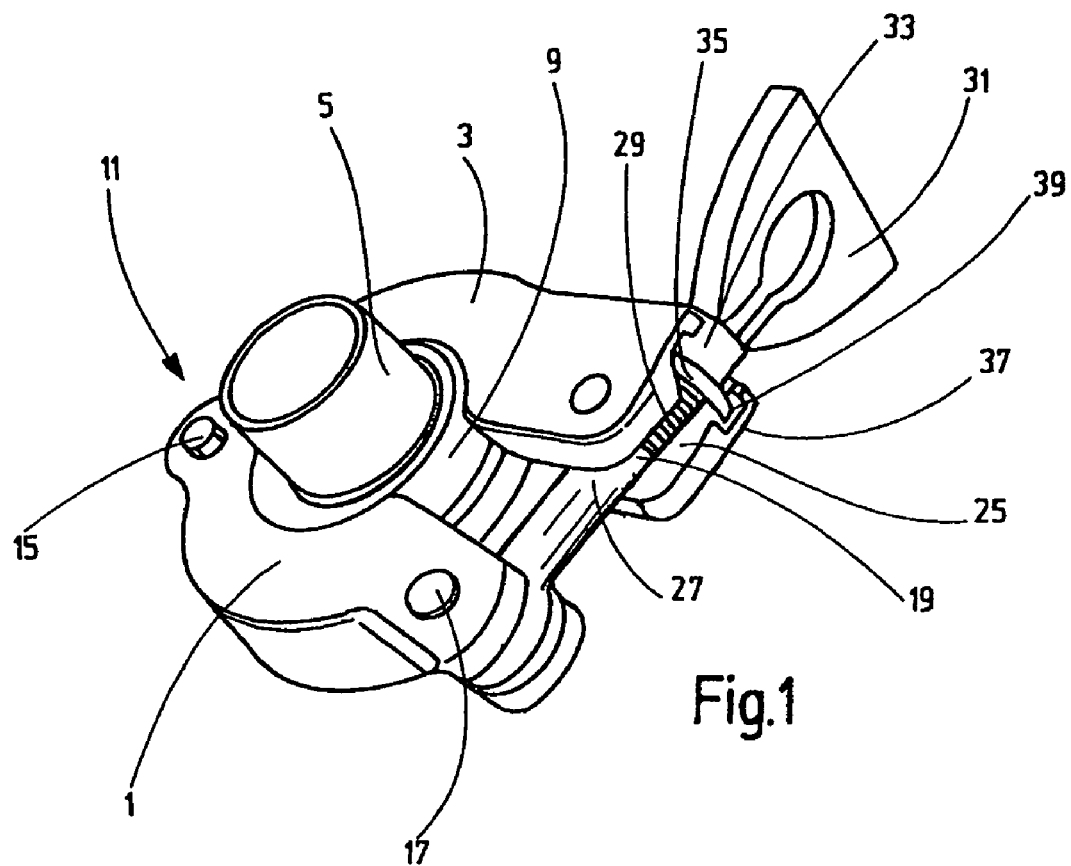
FIG. 1 is a perspective side view, in approximately full scale, of an exemplary embodiment of a clamp connector according to the invention in the active operating position in which the connector forms a clamping connection between welded pipe connection pieces, of which only one connection piece is visible.
Figure 2:
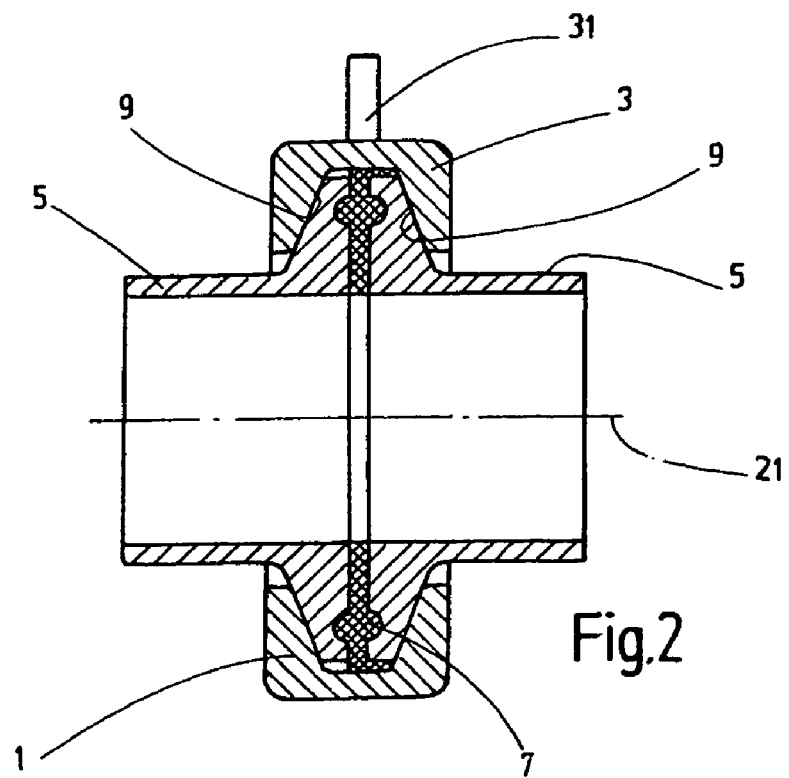
FIG. 2 is a side elevational view in section of the clamp connector of FIG. 1 with a sectional plane extending in the longitudinal direction, showing the clamping connection of the pipe connection pieces created.

FIGS. 1 and 2 show the clamp connector in the active functional state with a first clamping ring part 1 and a second clamping ring part 3 in a clamping position and situated close to one another. Two welded clamping connection pieces 5, of which only one is visible in FIG. 1, are clamped together. As FIG. 2 shows, a seal 7 shaped like an annular disk is located between the connection pieces 5. This seal is made of a plastic material compatible with the medium located in the pipeline system, for example, an ethylene-propylene-diene-rubber (EPDM) or other suitable plastic material. As FIG. 2 best illustrates, oblique surfaces 9 are located on the end flanges of pipe connection pieces 5 that are of like design. In cooperation with corresponding oblique surfaces on the insides of the clamping ring parts 1 and 3, radial clamping forces exerted by the clamping ring parts 1 and 3 generate an axial clamping force to ensure mutual clamping of the pipe connection pieces 5.

The clamping ring parts 1 and 3 are connected via a joint arrangement or ring part pivot joint 11 and are designed alike from the joint arrangement 11 up to the area near their opposite ends. In their middle areas, their shapes correspond to partial arcs. The joint arrangement 11 has a connecting tab 13 (see FIG. 4) which, like clamping ring parts 1 and 3 themselves, is made of special steel. Connecting tab 13 is in the shape of a flat, extended plate and is flexibly connected in both its end areas to the clamping ring parts 1 and 3 via pivot pins 15.

The clamping device for generating the clamping force is located on the forward activation ends of the clamping ring parts 1 and 3 opposite the joint arrangement 11. As the figures show, on the corresponding end of the first clamping ring part 1, a clamping screw 19 is linked via a pivot-out or screw pivot joint 17. The clamping screw 19 can be pivoted out of an active position shown in FIGS. 1 and 3, into release positions, specifically around a pivot axis parallel to the longitudinal axis 21 of the pipe (FIG. 2), as FIG. 4 illustrates.

In the active position, the clamping screw 19 extends through a passage 23 (FIG. 4) that is formed on the activation end of the second clamping ring part 3 and that is opened toward the front on the activation end of the clamping ring part 3 with an exit slot 25. The clamping screw 19 can be pivoted outward to switch the clamping device to the release position through the exit slot 25 or can be pivoted into the passage 23 to switch into the active position via the exit slot 25.

Figure 3:
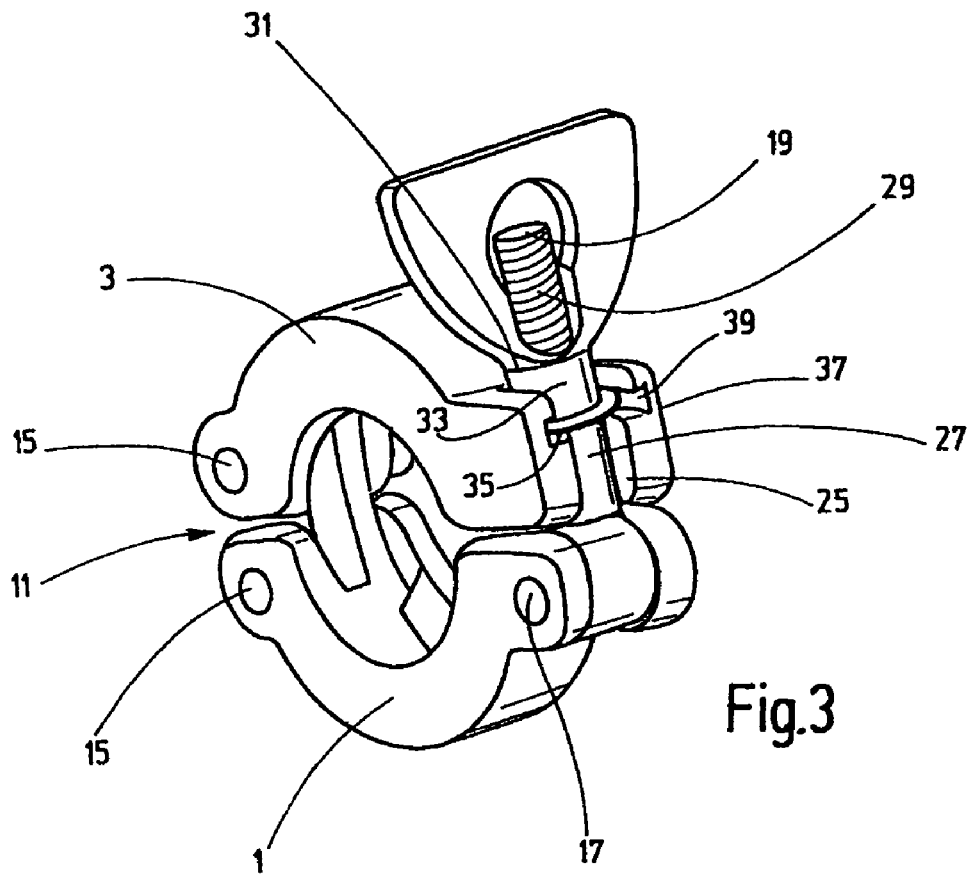
FIG. 3 is an oblique perspective view similar to FIG. 1, where the insides of clamping ring parts without pipe connection pieces are shown.

Due to the special design of the clamping screw 19 and the exit slot 25, the clamping device is equipped with a locking device allowing the clamping screw 19 to pivot out of the active position shown in FIGS. 1 and 3 only when safety-related conditions have been fulfilled. As FIGS. 1, 3, and 4 show, and as FIG. 4 most clearly illustrates, in the end area adjacent to the pivot-out joint 17, the clamping screw 19 has a collar 27 with a diameter larger than that of the threaded segment 29 of the clamping screw 19 adjacent to the collar 27. The locking device is formed by the diameter of the collar 27 being larger than the width of the exit slot 25, while the outer diameter of the threaded segment 29 is in turn smaller than the width of the exit slot 25. This arrangement provides simple and reliable assurance that, with the clamping screw 19 in the active position when the screw is housed in the passage 23, the clamping screw 19 cannot exit through the exit slot 25 because of the larger diameter of the collar 27 keeps it from passing through the exit slot 25.

Figure 4:
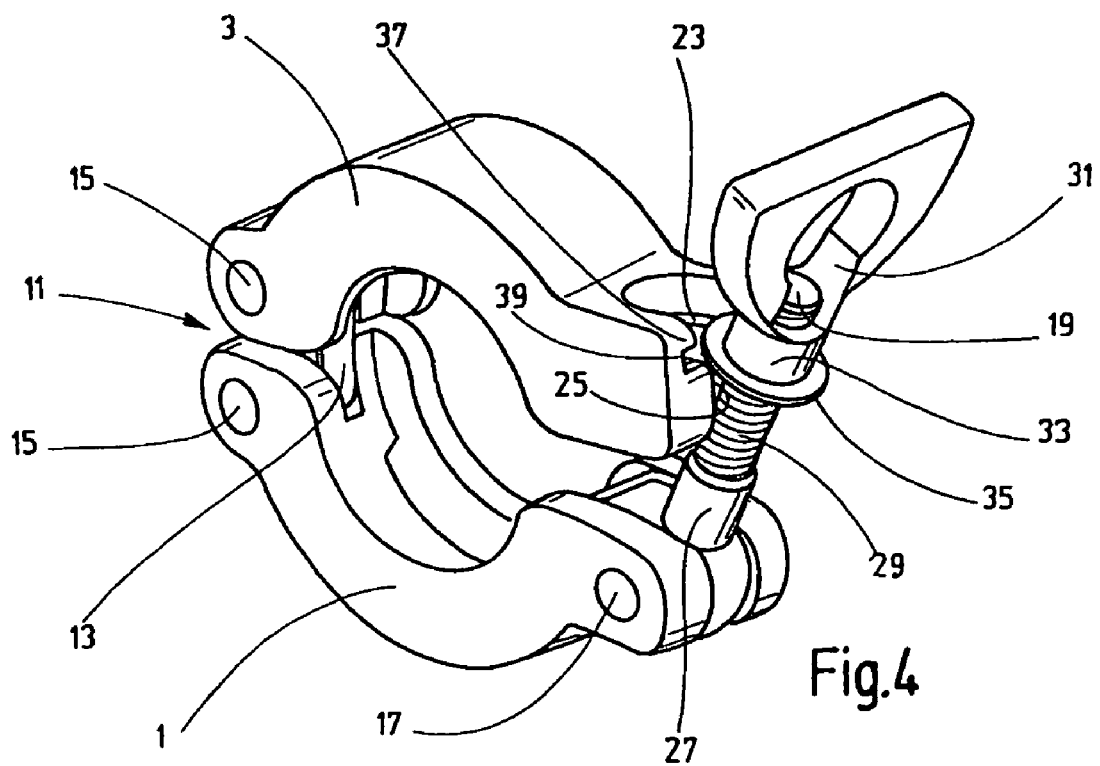
FIG. 4 is an oblique perspective view corresponding to FIG. 3, where the components allowing a clamping screw to pivot out are shown.

If a clamping nut 31 is threadedly engaged with the threaded segment 29 of the clamping screw 19 to generate the clamping force and is unscrewed to loosen the clamping device to the extent shown in FIG. 4. The clamping ring parts 1 and 3 are then separated from one another by an opening angle at which the collar 27 of the clamping screw 19 can leave the exit slot 25. The clamping device in this position switches to the release state since now the threaded segment 29, which is smaller in diameter than exit slot 25, can move through the exit slot 25. In other words, pivoting-in of the clamping screw 19 into the passage 23 and pivoting-out to release the clamping ring parts of 1 and 3 are thus possible only as a function of the predetermined opening angle of the clamping ring parts 1 and 3. As the figures also illustrate, the passage 23 and the exit slot 25 are stepped in a special way.

In cooperation with the special construction of the clamping nut 31, the clamping device not only has a locking device that prevents undesired pivoting-out, but a mechanism is also formed that forces the clamping ring parts 1 and 3 to open when the clamping nut 31 is unscrewed. For this purpose, on the end of a round shank part 33 the clamping nut 31 has a flange-like or shaped, radially projecting ring body 35. As a guide channel through which the ring body 35 moves when pivoting into the passage 23 and when pivoting out, the exit slot 25 forms an enlarged section 37 at the end area which is located at the top in the figures. In this enlarged section 37, grooves 39 are made or formed in the two side walls of the slot 25. The side walls of the grooves 39 form not only a guide channel for the ring body 35 when the clamping screw 19 pivots in and pivots out, but also form step surfaces that are located opposite one another. When the clamping nut 31 is tightened, the clamping force of the corresponding end surface of the ring body 35 is transferred via the step surfaces of the grooves 39 located at the bottom in the figures. Conversely, when the clamping nut 31 is loosened, the opposite upper end surface of the ring body 35 transfers a spreading force via the side walls of the grooves 39 that overlap the ring body 35. This spreading force necessarily causes an opening motion of the clamping ring parts 1 and 3 to occur when the clamping nut 31 is loosened.

This spreading force prevents the risk that extensive unscrewing of the clamping nut 31 can occur without a corresponding opening motion of the clamping ring parts 1 and 3, thereby avoiding the risk that, if the clamping nut 31 is completely loosened, in the event that the clamping ring parts 1 and 3 are potentially wedged in the clamped position and initially do not follow the loosening motion of the nut 31, inner pressure might build up and cause abrupt spreading of the clamping ring parts 1 and 3, with the concomitant risks associated therewith. Conversely, the invention ensures that, if the clamping nut 31 is loosened, a corresponding, controlled opening motion of the clamping ring parts 1 and 3 will take place.

While one embodiment has been chosen to illustrate the invention, it will be understood by those skilled in the art that various changes and modifications can be made therein without departing from the scope of the invention as defined in the appended claims.

What is claimed is:

1. A clamp connector for clamping together connecting pieces on pipelines, comprising:

first and second clamping ring parts having first and second opposite ends;

a ring part pivot joint pivotably connecting said ring parts at said first ends thereof for pivotal movement of said ring parts between spread and clamped positions, said ring parts being situated close to one another in said clamped positions;

a clamping device located on said second ends of said ring parts, said clamping device including a clamping screw pivotable at one end thereof to said first clamping ring part by a screw pivot joint between an active position generating a clamping force with said clamping ring parts forcing said clamping ring parts into the clamped positions and a release position pivoted out therefrom releasing said clamping ring parts, said clamping screw having a threaded segment spaced from said screw pivot joint and a collar adjoined to said screw pivot joint, said collar having a larger diameter than a diameter of said threaded segment;

a locking device having an active state preventing said clamping screw from pivoting to said release position passing through a predetermined opening angle from the active state into a release state permitting said clamping screw to pivot out;

a passage adjacent said second end of said second clamping ring part through said clamping screw extends in the active position thereof;

an exit slot in said second end of said second clamping ring allowing said clamping screw to pivot into and out of said passage, said exit slot having a width being smaller than said diameter of said collar and larger than said diameter of said threaded segment at least in a slot area adjacent to said first clamping ring part; and surface area parts on said second clamping ring part overlapping corresponding surface area parts of a clamping nut located on said threaded segment of said clamping screw in the active position thereof such that loosening of said clamping nut spreads said clamping ring parts apart.

2. A clamp connector according to claim 1 wherein said clamping nut comprises a longitudinal section housed in said passage of second clamping ring part when said clamping screw is in the active position, said surface area parts of said clamping nut being on said longitudinal section and transferring a clamping force to step surfaces of said passage when said clamping nut is tightened.

3. A clamp connector according to claim 2 wherein said longitudinal section of said clamping nut comprises a round shank part and a ring body projecting radially from said round shank part to form a flange, said flange having a first flange surface forming a longitudinal end of said shank part and transferring the clamping force and having an opposite second flange surface transferring a spreading force spreading said clamping ring parts apart.

4. A clamp connector according to claim 3 wherein said passage and said exit slot in said second clamping ring part are stepped allowing said ring body to be moved through an enlarged section of said exit slot into and out of said passage, said step surfaces extending into said passage at an end of said enlarged section being formed to transfer the clamping force of said first flange surface of said ring body of said clamping nut.

5. A clamp connector according to claim 4 wherein said enlarged section of said exit slot comprises grooves in two side walls of said exit slot, side wall walls of said grooves forming a guide channel for said ring body of said clamping nut when said clamping screw is pivoted into the active position and into the release position and forming said step surfaces in said passage transferring the clamping force and the spreading force.

* * * * *